United States Patent
Dry et al.

(10) Patent No.: US 11,518,278 B2
(45) Date of Patent: Dec. 6, 2022

(54) VEHICLE SEATING ASSEMBLY WITH DISPLACEABLE PLATFORM

(71) Applicant: Ford Global Technologies, LLC, Dearborn, MI (US)

(72) Inventors: Alan George Dry, Grosse Pointe Woods, MI (US); Johnathan Andrew Line, Northville, MI (US); Derek Board, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 17/182,491

(22) Filed: Feb. 23, 2021

(65) Prior Publication Data

US 2021/0206301 A1 Jul. 8, 2021

Related U.S. Application Data

(63) Continuation of application No. 16/445,283, filed on Jun. 19, 2019, now abandoned.

(51) Int. Cl.
*B60N 2/427* (2006.01)
*B60N 2/06* (2006.01)
*B60N 2/50* (2006.01)

(52) U.S. Cl.
CPC ............ *B60N 2/42763* (2013.01); *B60N 2/06* (2013.01); *B60N 2/42772* (2013.01); *B60N 2/502* (2013.01)

(58) Field of Classification Search
CPC .. B60N 2/42763; B60N 2/06; B60N 2/42772; B60N 2/502
See application file for complete search history.

(56) References Cited

U.S. PATENT DOCUMENTS

| | | | |
|---|---|---|---|
| 5,908,219 A * | 6/1999 | Bohmler | B60N 2/42781 297/468 |
| 6,419,317 B1 | 7/2002 | Westrich et al. | |
| 6,908,149 B1 * | 6/2005 | Yamaguchi | B60N 2/42781 297/284.11 |
| 7,104,601 B2 | 9/2006 | Masuda et al. | |
| 7,150,500 B2 * | 12/2006 | Hippel | B60N 2/4279 297/284.11 |
| 7,478,873 B2 | 1/2009 | Al-Samarae et al. | |
| 8,272,687 B2 * | 9/2012 | Gross | B60N 2/4221 297/284.11 |
| 8,297,697 B2 | 10/2012 | Gross et al. | |
| 8,393,681 B2 | 3/2013 | Gross et al. | |
| 8,573,691 B2 * | 11/2013 | Masutani | B60R 22/26 297/216.1 |

(Continued)

FOREIGN PATENT DOCUMENTS

CN 104648194 10/2017
KR 100570356 4/2006

*Primary Examiner* — Philip F Gabler
(74) *Attorney, Agent, or Firm* — Vichit Chea; Price Heneveld LLP

(57) ABSTRACT

A vehicle seating assembly having a seat cushion and a suspension system disposed proximate an underside of the seat cushion. The suspension system includes a carrier assembly, a displaceable platform, and an attachment member extending between the carrier assembly and the displaceable platform, wherein the attachment member is positionable between the rest position and an extended positon. The displaceable platform is positionable between a design position and a fully deployed position.

5 Claims, 14 Drawing Sheets

(56) References Cited

U.S. PATENT DOCUMENTS

| | | |
|---|---|---|
| 9,403,452 B2 | 8/2016 | Subramanian et al. |
| 10,589,646 B2 * | 3/2020 | Komura ............... B60N 2/0276 |
| 2009/0309397 A1 | 12/2009 | Gross et al. |
| 2011/0121620 A1 | 5/2011 | Masutani |
| 2015/0091338 A1 * | 4/2015 | Hayashi ................... B60N 2/62 |
| | | 297/313 |

\* cited by examiner

VEHICLE SEATING ASSEMBLY WITH DISPLACEABLE PLATFORM

CROSS-REFERENCE TO RELATED APPLICATIONS

This application is a continuation of U.S. patent application Ser. No. 16/445,283, filed Jun. 19, 2019, entitled "VEHICLE SEATING ASSEMBLY WITH DISPLACEABLE PLATFORM," the full disclosure of which is incorporated herein by reference.

FIELD OF THE INVENTION

The present invention generally relates to a vehicle seating assembly, and more specifically to a vehicle seating assembly designed to regulate the position of a seating assembly passenger during a sudden vehicle deceleration.

BACKGROUND OF THE INVENTION

A vehicle seating assembly may have features that manage the position of a passenger on a vehicle seat.

SUMMARY OF THE INVENTION

According to one aspect of the present invention, a vehicle seating assembly has a seat cushion and a suspension system disposed proximate an underside of the seat cushion. The suspension system includes a carrier assembly, a displaceable platform, and an attachment member extending between the carrier assembly and the displaceable platform, wherein the attachment member is positionable between the rest position and an extended positon. The displaceable platform is positionable between a design position and a fully deployed position.

Embodiments of the first aspect of the invention can include any one or a combination of the following features:
- in the design position the displaceable platform has a first height and wherein in the fully deployed position the displaceable platform has a second height;
- the second height is greater than the first height;
- the suspension system further comprises a pitch plate disposed between the carrier assembly and the displaceable platform;
- the pitch plate is in a primary position when the displaceable platform is in the design position and wherein the pitch plate is in a secondary position when the displaceable platform is in the fully deployed position;
- the primary position is a lowered position and wherein the secondary position is a raised position;
- the carrier assembly includes a carrier having four segments;
- the four segments include first and second opposing segments positioned longitudinally along a seat and third and fourth segments positioned laterally across the seat;
- the attachment member is coupled to the fourth segment;
- the pitch plate is coupled to the third segment;
- wherein the pitch plate includes first and second attachment members extending from the pitch plate and wherein the first and second attachment members are coupled to the third segment;
- the first and second attachment members are rotationally coupled to the third segment;
- the carrier assembly comprises a carrier including a first segment, a second segment, a third segment, and a fourth segment, and a panel including a first flange, a second flange, and a third flange, wherein the panel is disposed on the carrier so that the first flange of the panel is coupled to the first segment of the carrier, the second flange of the panel is coupled to the second segment of the carrier, and the third flange of the panel is coupled to the fourth segment of the carrier; and
- the panel includes an elongated notch, wherein the attachment member includes a first end and a second end, wherein the first end of the attachment member is coupled to a T-shaped link that extends from the displaceable platform and through the elongated notch, and wherein the second end of the attachment member is coupled to the fourth segment of the carrier.

According to a second aspect of the present disclosure, a vehicle seating assembly includes a seat having front and rear portions, a displaceable platform disposed on a carrier assembly, wherein the displaceable platform is movable between a design position and a fully deployed position, and an attachment member and a retention mechanism, wherein the attachment member is coupled to a rear portion of the carrier assembly and the displaceable platform and wherein the retention mechanism is coupled to a front portion of the carrier assembly and the displaceable platform, wherein the displaceable platform is disposed proximate the rear portion of the carrier assembly in the design position and wherein the displaceable platform is disposed proximate the front portion of the carrier assembly in the fully deployed position.

Embodiments of the second aspect of the disclosure can include any one or a combination of the following features:
- the attachment member is positionable between a rest position when the displaceable platform in in a design position and an extended position when the displaceable platform is in a fully deployed position;
- the retention mechanism comprises a pitch plate, wherein the pitch plate is in a lowered position when the displaceable platform is in a design position, and wherein the pitch plate is in a raised position when the displaceable platform is in a fully deployed position;
- the carrier assembly includes a carrier, wherein the pitch plate includes first and second attachment members, and wherein the first and second attachment members are rotatably coupled to a tubular front segment of the carrier; and
- the attachment member is coupled to a rear segment of the carrier, wherein the carrier assembly includes a panel disposed between the carrier and the displaceable platform, and wherein a T-shaped link connects the displaceable platform to the attachment member.

According to a third aspect of the present disclosure, a seating assembly includes a seatback and a seat including a cushion, a displaceable platform, a carrier assembly, and a seat frame assembly, wherein the carrier assembly is fixedly coupled to the seat frame assembly, wherein an attachment member and a retention mechanism are disposed between the displaceable platform and the carrier assembly, and wherein the displaceable platform is movable relative to the carrier assembly between a design position and fully deployed position in response to a sudden vehicle deceleration.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
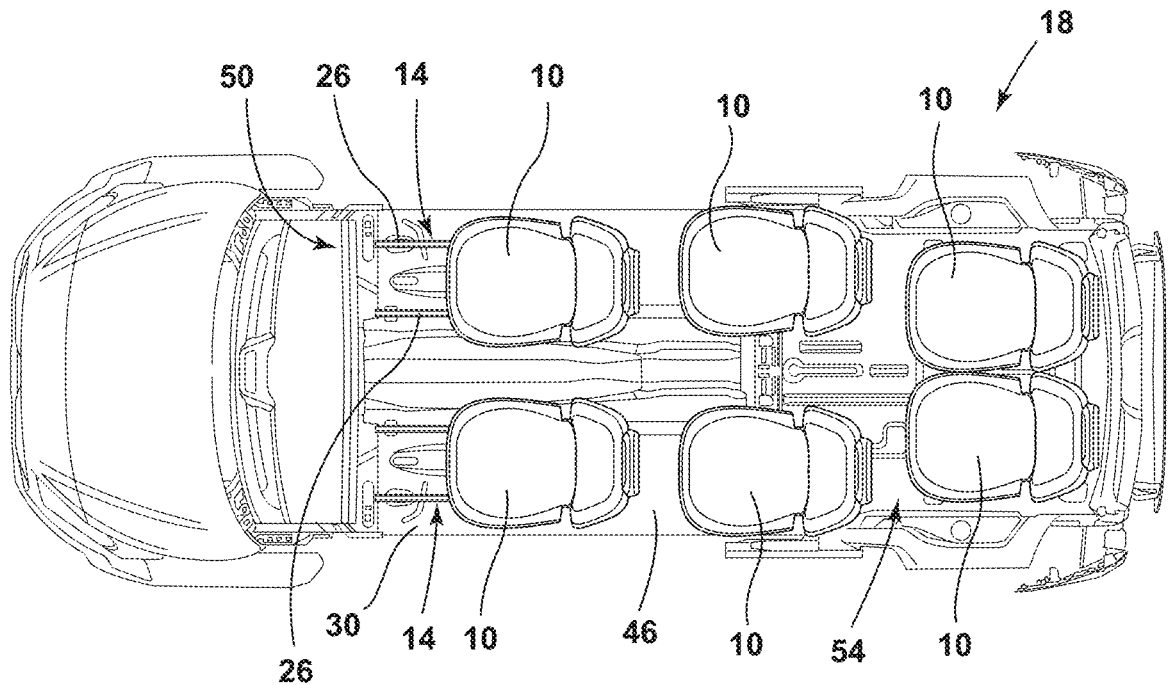
FIG. 1 is a top plan view of a portion of a vehicle having a plurality of seating assemblies in a first configuration.

For purposes of description herein, the terms "upper," "lower," "right," "left," "rear," "front," "vertical," "horizontal," and derivatives thereof shall relate to the concepts as oriented in vehicle 18 of FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the seating assembly 10 described below and shown in the attached figures, a seating assembly 10 may be described from the vantage point of a passenger 12 seating in the seating assembly 10. The side of a seating assembly 10 disposed on a right side of a seated passenger 12 may be referred to as a right side or a first side of the seating assembly 10. The side of a seating assembly 10 disposed on a left side of a seated passenger 12 may be referred to as a left side or a second side of the seating assembly 10.

Figure 2:
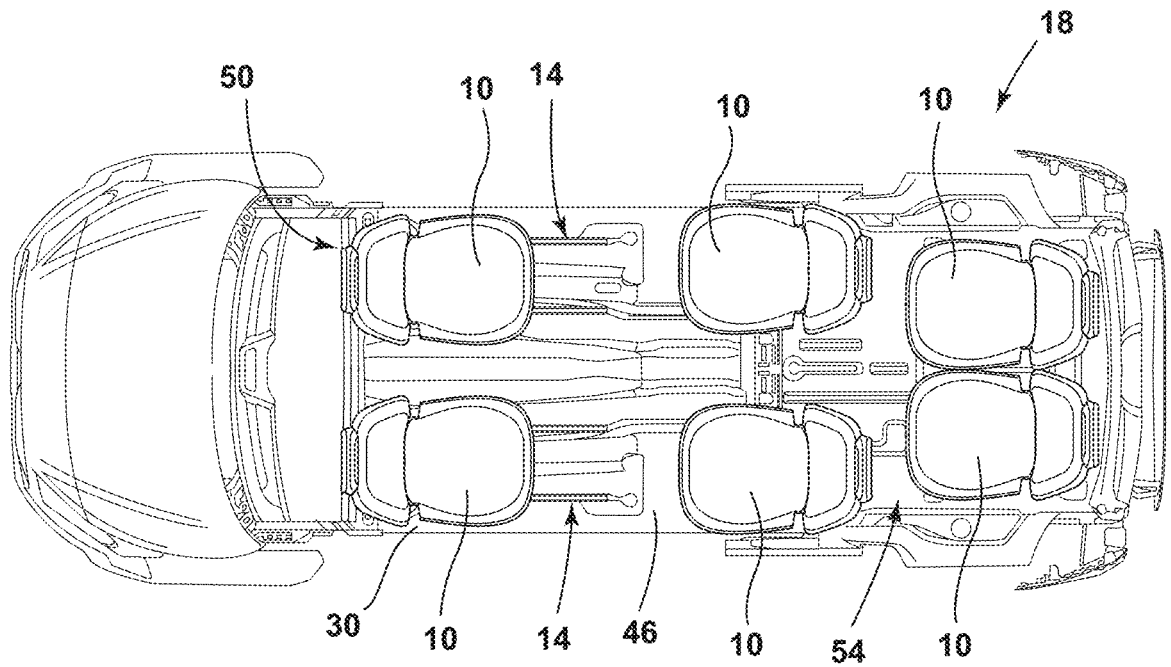
FIG. 2 is a top plan view of a portion of a vehicle having a plurality of seating assemblies in a second configuration.
Figure 3:
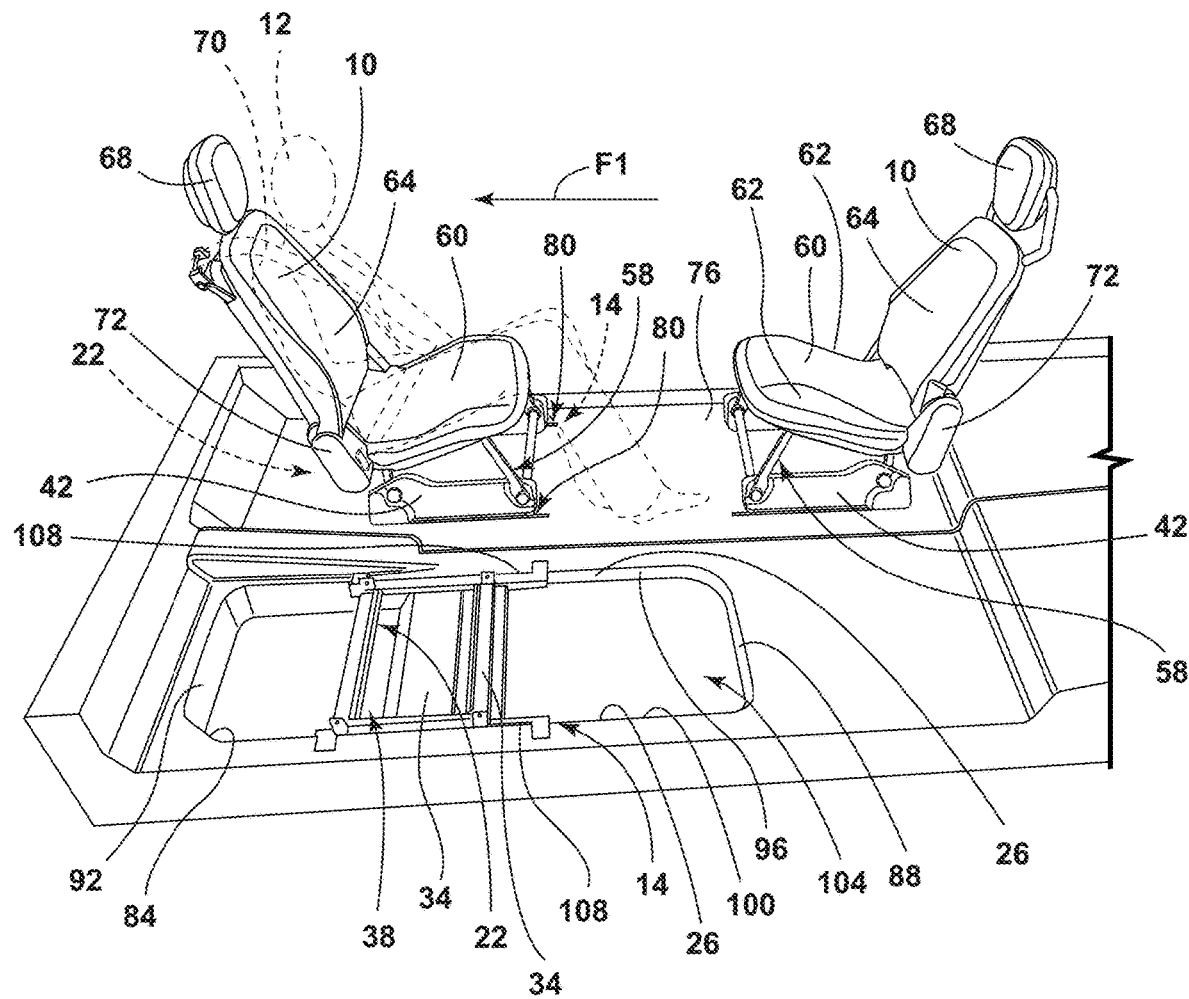
FIG. 3 is a side perspective view of a floor of a vehicle including a plurality of seating assemblies and a track assembly.

Referring to FIGS. 1-3, a vehicle seating assembly 10 may include various features for providing movability of the vehicle seating assembly 10. The vehicle seating assembly 10 may include a track assembly 14 for translating the vehicle seating assembly 10 fore and aft within the vehicle 18. The track assembly 14 may be a long track assembly 14 or a short track assembly 14 for full or partial movement of the seating assembly 10 within the vehicle 18, respectively. The seating assembly 10 may further include a platform 22 extending between tracks 26 of the track assembly 14. The platform 22 and the track assembly 14 may be integrated into the vehicle underbody frame 30 to provide structural stiffness and side-impact performance. The platform 22 includes cross-members 34 configured to allow the structural stiffness needed for side-impact performance to move with the seating assembly 10, allowing the seating assembly 10 to be moved into various positions while maintaining structural support. Further, the platform 22 may also include a universal attachment system 38 to allow various seating assemblies to couple with the platform 22 including, for example, rotating seating assemblies. Also, a seating assembly 10 may have a base member 42 that may be a module that may be received by the universal attachment system 38 of the platform 22. The platform 22 may include extendable, or widening, cross-members 34 that may be adjustable to configure the platform 22 to receive base members 42 of various widths that may correspond to seating assemblies 10 of various widths.

Referring now to FIGS. 1 and 2, a vehicle underbody frame 30 is shown having a plurality of seating assemblies 10. The vehicle underbody frame 30 may include a floor panel 46 configured to support the plurality of seating assemblies 10. The vehicle underbody frame 30 may further include a front area 50 and a rear area 54. One or more of the plurality of seating assemblies 10 may be configured as the movable vehicle seating assembly 10. It is contemplated that the vehicle 18 may be any type of vehicle, for example a car, a truck, a van, or other vehicle. It is also contemplated that the vehicle 18 may be an autonomous vehicle. It is also contemplated that the concept set forth in this disclosure may be utilized in the front area 50 of the vehicle 18 as well as the rear area 54 of the vehicle 18, depending on the configuration of the vehicle 18.

A portion of the plurality of seating assemblies 10 of FIGS. 1 and 2 is shown positioned within the front area 50 of the vehicle 18 with one or more of the plurality of seating assemblies 10 being configured as a movable vehicle seating assembly 10. Another portion of the plurality of seating assemblies 10 may be positioned elsewhere within the vehicle 18. The plurality of seating assemblies 10 may be operably coupled to the floor panel 46 of the vehicle 18 by track assemblies 14. Any one of the plurality of seating assemblies 10 may be configured as a movable vehicle seating assembly 10. The vehicle seating assemblies 10 may be translatable along the respective track assembly 14 between a first position of the seating assembly 10 (FIG. 1) and a second position of the seating assembly 10 (FIG. 2).

Additionally, the vehicle seating assemblies 10 may be rotatable relative to the platform 22 using a swivel assembly (not shown). Where the vehicle seating assemblies 10 are rotatable, the vehicle seating assemblies 10 may further be movable between a forward facing position in the vehicle 18 (FIG. 1) and a rearward facing position in the vehicle 18 (FIG. 2).

Referring now to FIG. 3, the seating assembly 10 may include a seat 60 and a seatback 64. The seat 60 may be disposed above the base member 42. A linkage assembly 58 for securing the seat 60 to the base member 42 may be disposed between the seat 60 and the base member 42. The seat 60 may include bolsters 62 that may be disposed on opposing sides of the seat 60. The seatback 64 may be pivotally coupled to the seat 60. A headrest 68 may be coupled to the seatback 64. The passenger 12 may be restrained by a seat belt 70. According to various examples, the seating assembly 10 may include covers 72 positioned on either side of the seating assembly 10.

A floor cover 76 may be positioned above and parallel to the floor panel 46 and may be configured to conceal the track assembly 14. The floor cover 76 may define a plurality of slots 80. The plurality of slots 80 may be defined over the tracks 26 of the track assembly 14, such that the platform 22 may extend at least partially through the plurality of slots 80 to couple to the track assembly 14. Each of the slots 80 may be defined to have a length selected to allow movement of the seating assembly 10 between the first position of the seating assembly 10 (FIG. 1) and the second position of the seating assembly 10 (FIG. 2).

The floor cover 76 may further conceal a cutout 84 of the floor panel 46. The cutout 84 may be configured to house the track assembly 14. The cutout 84 may include front and rear walls 88, 92 and sidewalls 96, 100. The sidewalls 96, 100 may be spaced apart and may frame a void 104 of the cutout 84. The track assembly 14 may be positioned within the void 104. In various examples, the platform 22 may at least partially be positioned within the void 104 and the track assembly 14. The track assembly 14 may include guides 108 positioned on first and second sides of the seating assembly 10 and operably coupled with the cutout 84. The guides 108 may be positioned in pairs. Each guide 108 may be operably coupled with one of the sidewalls 96, 100, such that the track assembly 14 is recessed within the cutout 84, as the seating assembly 10 is translated between the first position of the seating assembly 10 (FIG. 1) and the second position of the seating assembly 10 (FIG. 2).

Referring to FIGS. 1-18, a vehicle seating assembly 10 includes a seat cushion 112 and a suspension system 128 disposed proximate an underside 126 of the seat cushion 112. The suspension system 128 includes a carrier assembly 120, a displaceable platform 124, and an attachment member 160. The attachment member 160 extends between the carrier assembly 120 and the displaceable platform 124. The attachment member 160 is positionable between a rest position A3 and an extended position B3. The displaceable platform 124 is positionable between a design position A1 and a fully deployed position B1.

Vehicles may provide new and flexible vehicle interior seating configurations. As a result, the vehicle may include various safety features for protecting passengers during a sudden deceleration of the vehicle (represented by a force F1 in FIGS. 3 and 4). These safety features may include seat belts, airbags, occupant positioning management seat designs, and other passenger restraints.

Figure 4:
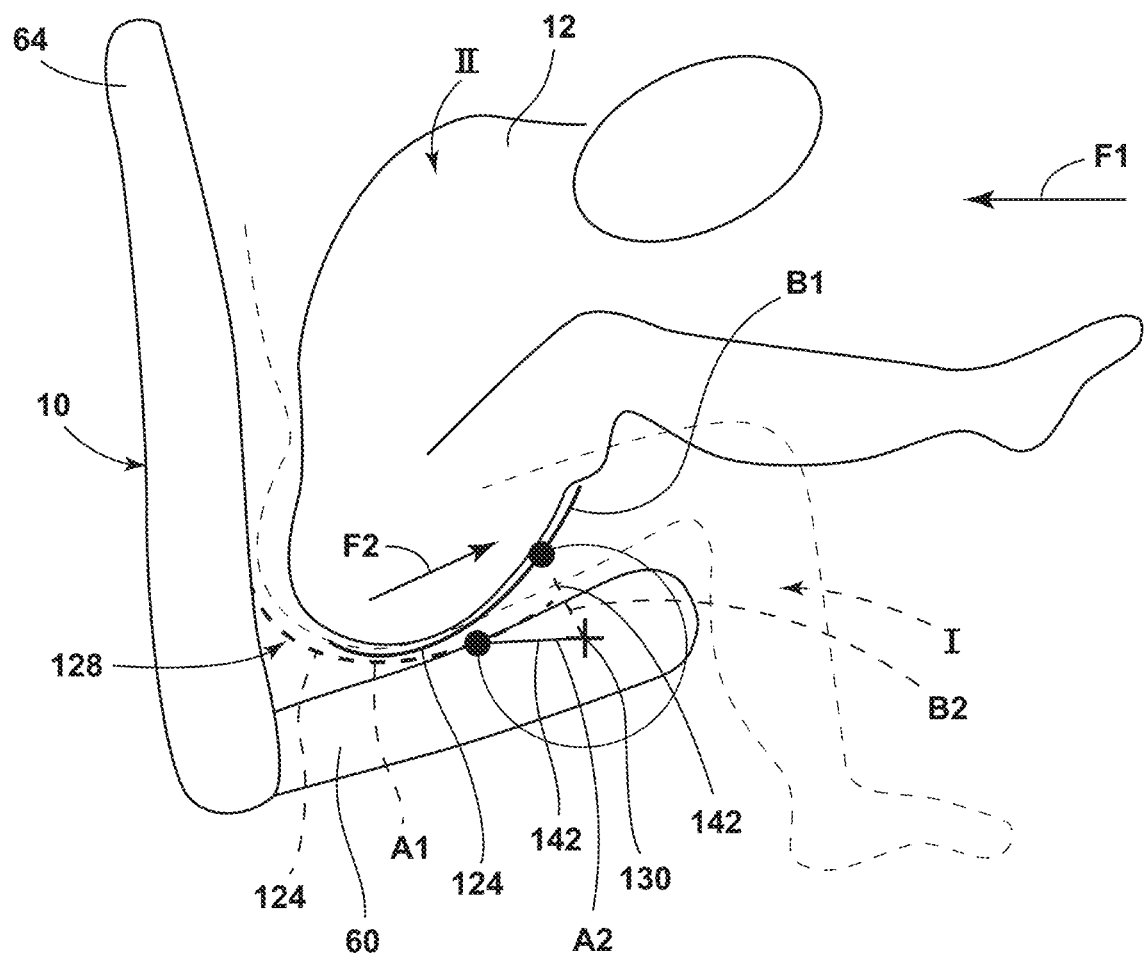
FIG. 4 is a side schematic view of a seating assembly with a displaceable platform in a design position and a fully deployed position.

Referring to FIG. 4, a passenger 12 is shown disposed in a vehicle seating assembly 10. A displaceable platform 124 and the pitch plate 142 are schematically shown below the passenger 12. The displaceable platform 124 is shown in a design position A1 and a fully deployed position B1. The displaceable platform 124 may move from the design position A1 to the fully deployed position B1 in response to a sudden deceleration of a vehicle 18 represented by force F1 in FIGS. 3 and 4. As the displaceable platform 124 moves from a design position A1 to a fully deployed position B1, the pitch plate 142 may move from a lowered position A2 to a raised position B2. The pitch plate 142 may rotate about an axis 130. The axis 130 may extend through the third segment 148C of the carrier 148 (see FIGS. 8 and 10). The passenger 12 is shown in a first position I prior to a sudden deceleration of a vehicle 18 represented by force F1 in FIGS. 3 and 4. In response to force F1, the weight of the passenger 12 and a restraint of the passenger (e.g., a seat belt 70, an air bag, a restraint system that is deployable with the airbag, and/or another passenger restraint) may exert a force F2 on the displaceable platform 124 that may move the displaceable platform 124 from the design position A1 to the fully deployed position B1.

Figure 5:
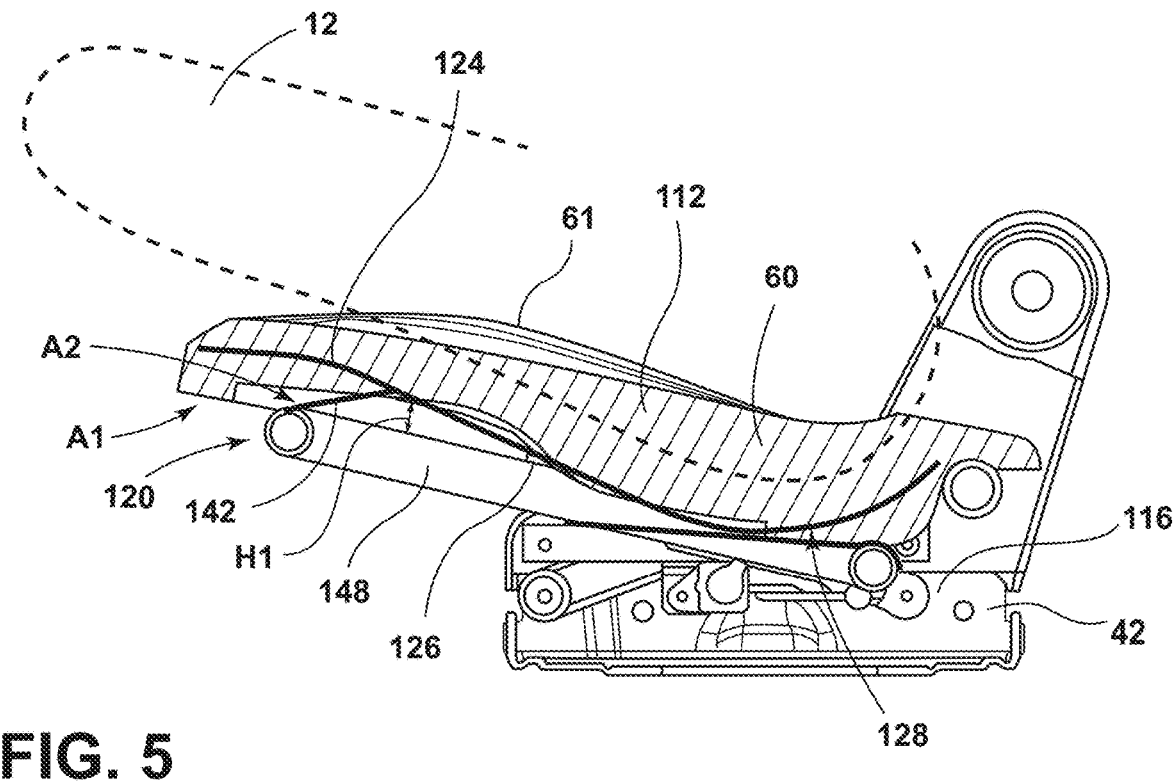
FIG. 5 is a side schematic view of a displaceable platform in a design position.

Referring to FIG. 5, displaceable platform 124 is shown in a design position A1. The displaceable platform 124 may be disposed under or in a seat cushion 112. The displaceable platform 124 may be coupled to a seat frame assembly 116 or other seating assembly support structure. It is contemplated that the displaceable platform 124 may be used in a seating assembly 10 including a seat 60 and a seatback 64. A suspension system 128 may include a carrier assembly 120, a displaceable platform 124, and attachments between the carrier assembly 120 and the displaceable platform 124. In the example shown, the attachments between the carrier assembly 120 and the displaceable platform 124 may include an attachment member 160 and a pitch plate 142. The suspension system 128 may be coupled to a base member 42. The base member 42 may be a module that may be coupled to a universal attachment system 38 of the track assembly 14. In the example shown, the base member 42 is shown disposed above tracks 26. The pitch plate 142 is an example of a retention mechanism that may be disposed between the carrier assembly 120 and the displaceable platform 124. The retention mechanism may limit movement of the displaceable platform 124. The pitch plate 142 is shown in a lowered position A2. The displaceable platform 124 may have a height H1. The height H1 may be measured from a line that is substantially parallel to the carrier 148 to the intersection of the pitch plate 142 with the displaceable platform 124.

Figure 6:
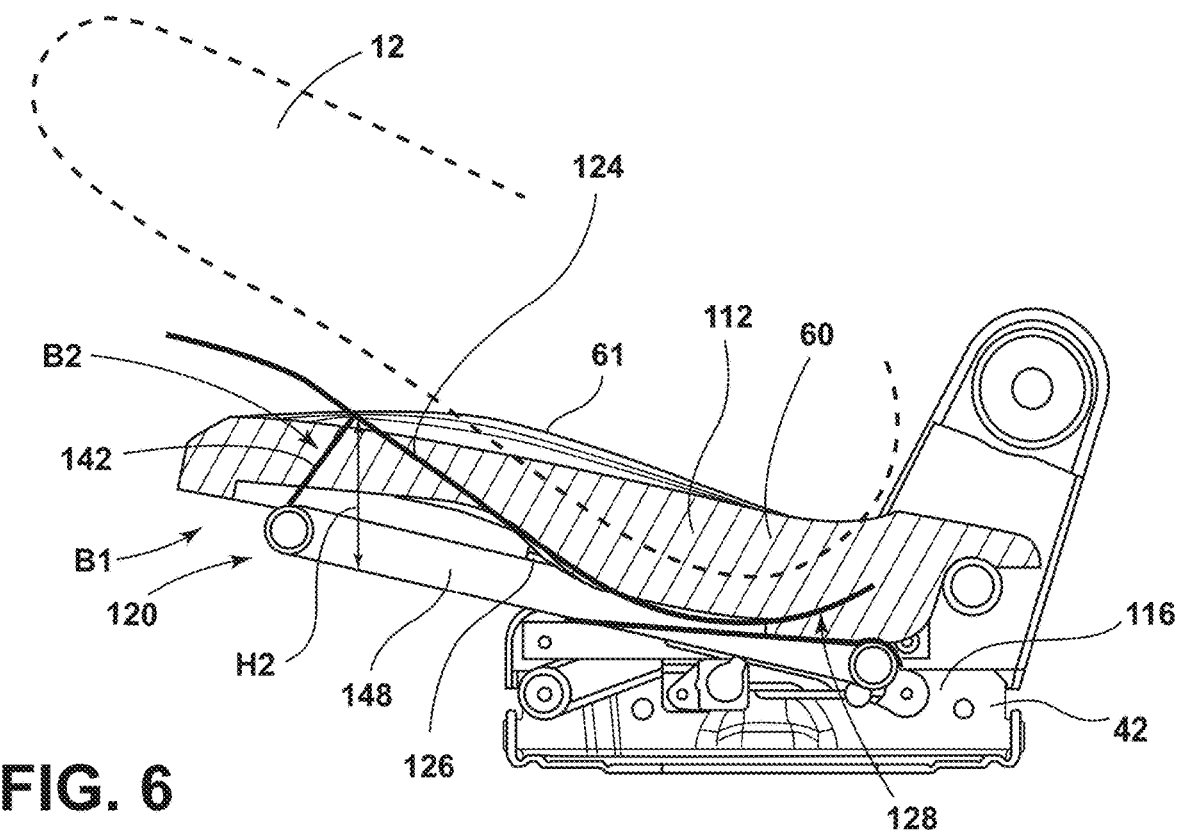
FIG. 6 is a side schematic view of the displaceable platform of FIG. 5 in a fully deployed position.

Referring to FIG. 6, the displaceable platform 124 is shown in a fully deployed position B1. As previously explained, when the vehicle 18 experiences a sudden deceleration (as represented by a force F1 in FIGS. 3 and 4), then the displaceable platform 124 may move from a design position A1 to a fully deployed position B1. In the fully deployed position B1 of the displaceable platform 124, a pitch plate 142 disposed between the carrier assembly 120 and the displaceable platform 124 may limit movement of the displaceable platform 124. As previously stated, the retention mechanism (pitch plate 142) may be in the lowered position A2 when the displaceable platform 124 is in the design position A1 (FIG. 5). The retention mechanism (pitch plate 142) may be in the raised position B2 (FIG. 6) when the displaceable platform 124 is in the fully extended position B1. In the lowered position A2, the retention mechanism (pitch plate 142) may have a height H1 (FIG. 5). In the fully deployed position B1, the retention mechanism (pitch plate 142) may have a height H2 (FIG. 6). Height H2 may be greater than height H1. The lowered position A2 of the retention mechanism may be referred to as the primary position of the retention mechanism. The raised position B2 of the retention mechanism may be referred to as the secondary position of the retention mechanism. The design of the retention mechanism (pitch plate 142) may limit the upward movement of the displaceable platform 124 to a predetermined height H2. As such, the height H2 may be a predetermined height selected to regulate movement of the passenger 12 along the seat surface 61. The degree of rotation of the pitch plate 142 around axis 130 between the design position A1 and the fully deployed position B1 of the displaceable platform 124 may be predetermined to regulate the position of the passenger 12 subsequent to a sudden deceleration of the vehicle 18 represented by force F1 in FIGS. 3 and 4.

Figure 7:
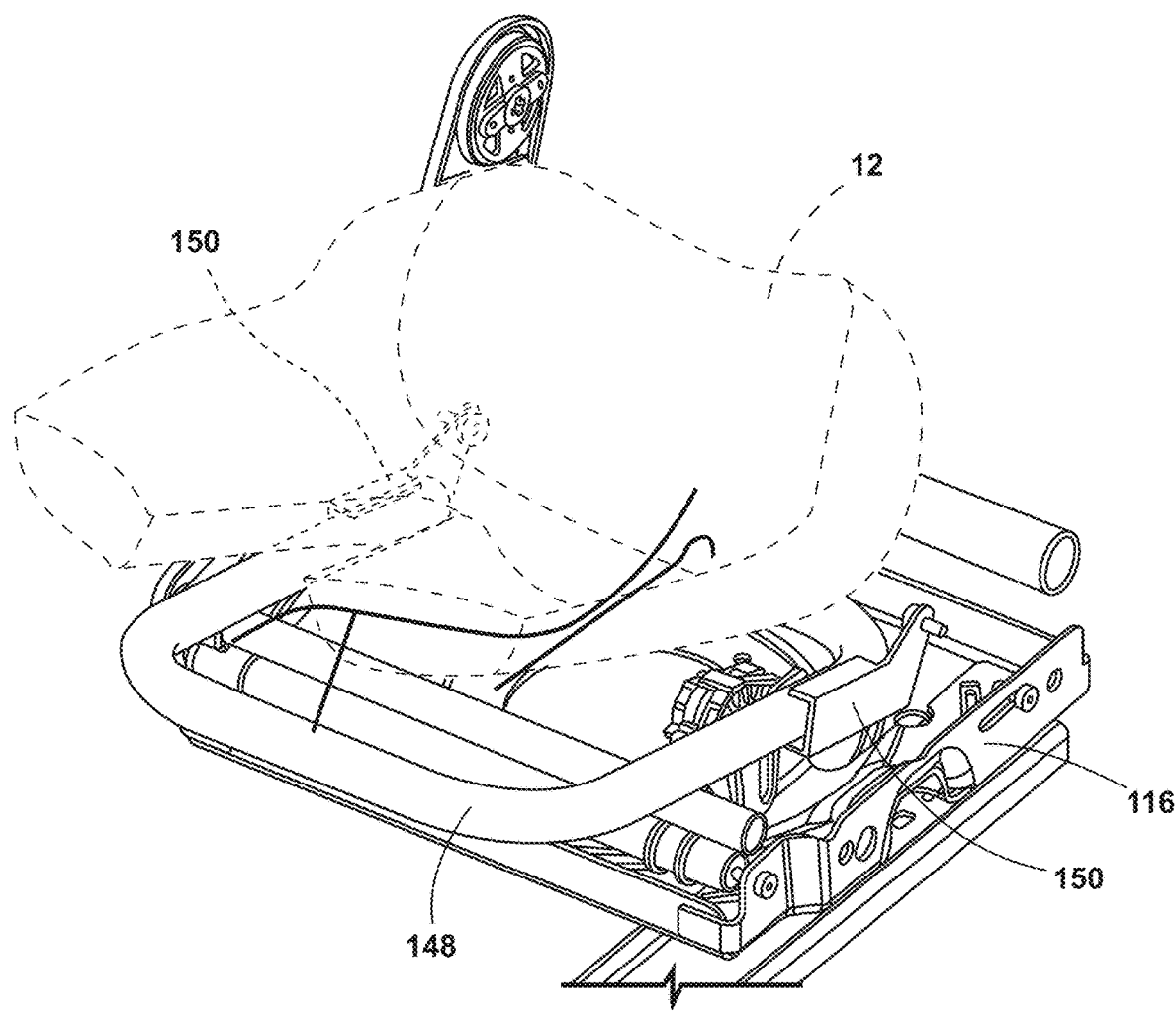
FIG. 7 is a side perspective view of a carrier and a base member in a design position.

Referring to FIG. 7, a front perspective view is shown of the passenger 12 disposed above the carrier 148. The carrier 148 is shown coupled to the seat frame assembly 116 with opposing brackets 150. In the example shown, the brackets 150 may fixedly attach the carrier 148 to the seat frame assembly 116. The seat frame assembly 116 may be disposed in the base member 42. The base member 42 may be coupled to the tracks 26. As previously explained, the base member 42 may also be a module that may be received by the universal attachment system 38 of the platform 22. As such, the carrier 148 may be mounted to the seat frame assembly 116, and a base member 42 may house the seat frame assembly 116.

Figure 8:
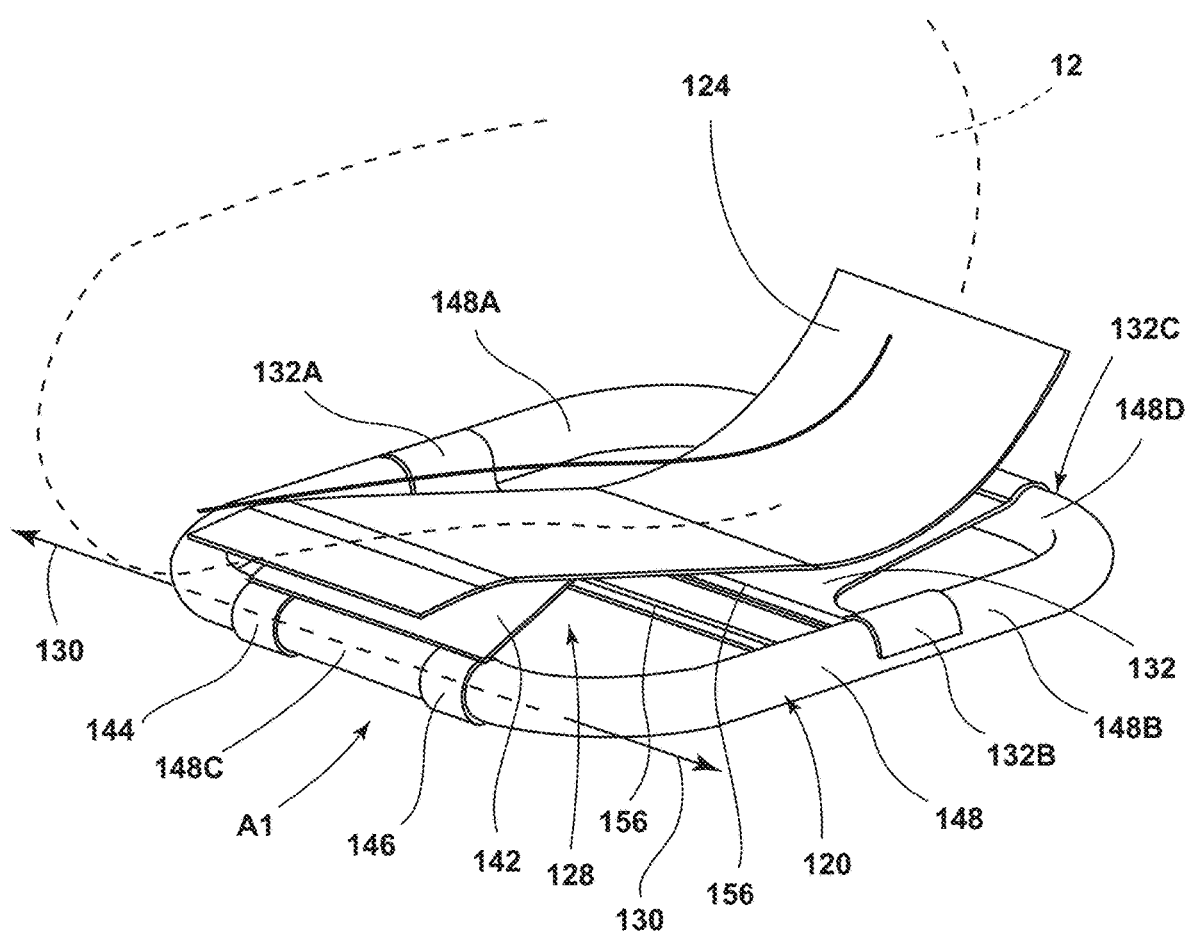
FIG. 8 is a side perspective view of a carrier assembly and a displaceable platform in a design position.

Referring now to FIG. 8, a top perspective view is shown of an outline of a passenger 12 above a suspension system 128. The displaceable platform 124 is shown in a design position A1. As previously stated, the suspension system 128 may include a carrier assembly 120, a displaceable platform 124, and attachments between the carrier assembly 120 and the displaceable platform 124. In the example shown, the carrier assembly 120 includes a carrier 148 and a panel 132 disposed on the carrier 148. The carrier 148 may include a rectangular shape. The carrier 148 may be tubular. The carrier 148 may include a first and second opposing segments 148A, 148B disposed on respective first and second sides of a seated passenger 12. First and second opposing segments 148A, 148B may be disposed longitudinally along the seat 60. The carrier 148 may also include third and fourth segments 148C, 148D disposed on respective front and rear portions of the carrier 148. The third and fourth segments 148C, 148D may be disposed laterally across the seat 60. The panel 132 may be T-shaped. The panel 132 may include a first flange 132A disposed on the first segment 148A of the carrier 148. The panel 132 may include a second flange 132B disposed on a second segment 148B of the carrier 148. The panel 132 may include a third flange 132C disposed on the fourth segment 148D of the carrier 148. The first, second, and third flanges 132A, 132B, 132C of the panel 132 may be curved. As such, in the example shown, the first, second, and third flanges 132A, 132B, 132C may be curved, and a smooth interface may exist between the first, second, and third flanges 132A, 132B, 132C and the respective first, second, and fourth segments 148A, 148B, 148D of the tubular frame of the carrier 148. The panel 132 may include cross members 156. A pitch plate 142 is shown disposed between the displaceable platform 124 and the third segment 148C of the carrier 148.

With continued reference to FIG. 8, the pitch plate 142 may be attached to the carrier 148 with first and second attachments 144, 146. First and second attachments 144, 146 may encircle the third segment 148C of the carrier 148. First and second attachments 144, 146 may rotate about the third segment 148C of the carrier 148 as the displaceable platform 124 moves between the design position A1 and the fully deployed position B1. The first and second attachments 144, 146 may include pivot bearings. An axis 130 may extend through the third segment 148C of the carrier 148. The first and second attachments 144, 146 may rotate about the axis 130.

Figure 9:
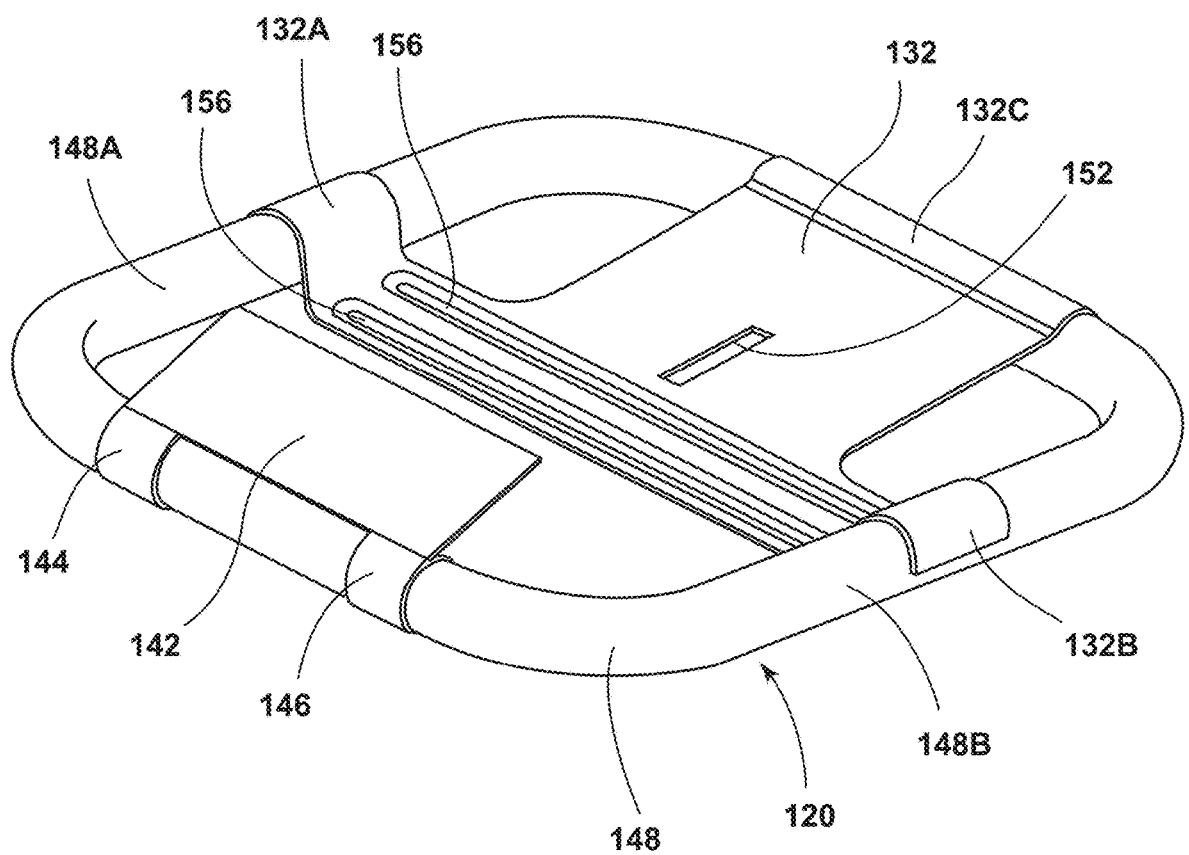
FIG. 9 is a top perspective view of the carrier assembly and the pitch plate.

With reference to FIG. 9, the carrier assembly 120 and the pitch plate 142 are shown. The panel 132 may include cross members 156. The panel 132 may also include an elongated notch 152. The elongated notch 152 may be longitudinally aligned with the first and second segments 148A, 148B of the carrier 148. The elongated notch 152 may include a rectangular shape. In various examples, the carrier 148 may be a steel or another durable material. The displaceable platform 124 may be a polymer, a metal, or another durable material. The pitch plate 142 may be a metal or other durable material.

Figure 10:
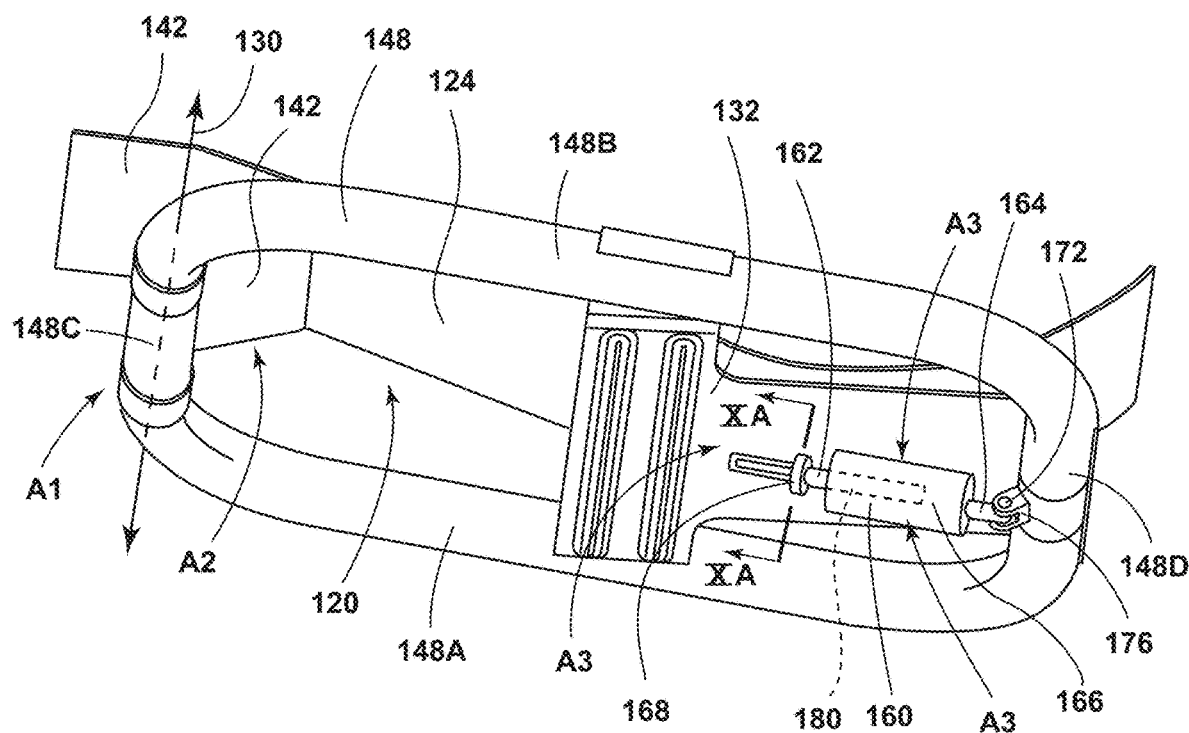
FIG. 10 is a bottom perspective view of the suspension system with the displaceable platform in the design position, according to an embodiment.

Referring now to FIG. 10, a bottom perspective view of a carrier assembly 120, a displaceable platform 124, a pitch plate 142, and an attachment member 160 are shown. The displaceable platform 124 is shown in the design position A1. The pitch plate 142 is shown in the lowered position A2. The attachment member 160 is shown in the rest position A3. The attachment member 160 may include a first end 162 and a second end 164. The attachment member 160 may include a connector 166 disposed between the first end 162 and the second end 164. The first end 162 may be coupled to a T-shaped link 168 that may extend through the elongated notch 152 in the panel 132. The T-shaped link 168 of the attachment member 160 may be secured to the displaceable platform 124. The second end 164 of the attachment member 160 may be pivotably coupled to the fourth segment 148D of the carrier 148. The pivotable coupling may include a pin 172 extending through a u-shaped bracket 176.

Figure 10A:
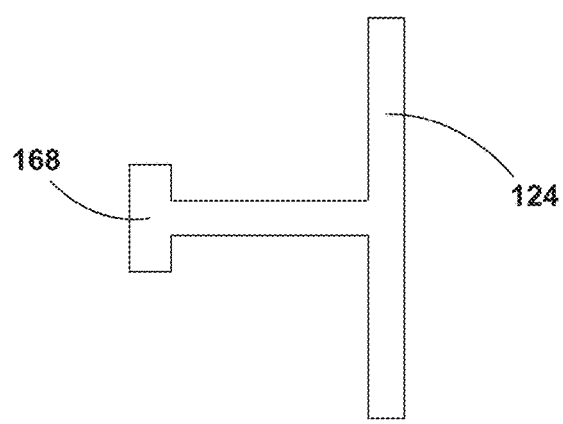
FIG. 10A is a cross-sectional view of a portion of the suspension system with the displaceable platform taken along line XA-XA of FIG. 10.

Referring to FIG. 10A, the T-shaped link 168 may be connected to the displaceable platform 124. Referring again to FIG. 10, as the displaceable platform 124 moves from a design position A1 to a fully deployed position B1 in response to a sudden deceleration of a vehicle 18 represented by arrow F1 in FIGS. 3 and 4, the displaceable platform 124 may slide along the panel 132 and toward the third segment 148C of the carrier 148.

Referring again to FIG. 10, the attachment member 160 is shown in the rest position A3. The attachment member 160 may include a telescoping member 180. The telescoping member 180 may be within the connector 166 when the attachment member 160 is in a rest position A3. The telescoping member 180 may extend from the connector 166 when the attachment member 160 is in the extended position B3. (FIG. 11.)

Figure 11:
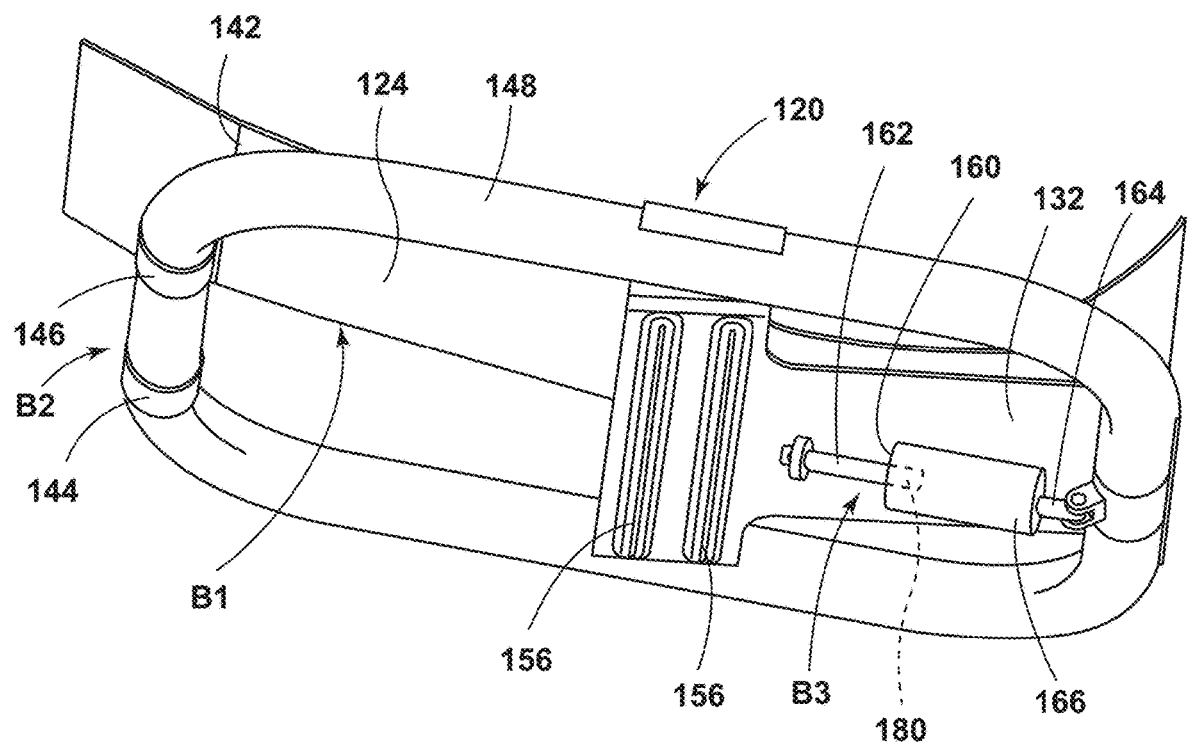
FIG. 11 is a bottom perspective view of the suspension system of FIG. 10 with the displaceable platform in the fully deployed position.

Referring now to FIG. 11, a bottom perspective view of a carrier assembly 120, a displaceable platform 124, a pitch plate 142, and an attachment member 160 is shown. The displaceable platform 124 is shown in the fully deployed position B1. The pitch plate 142 is shown in the raised position B2. The attachment member 160 is shown in the extended position B3.

Figure 12:
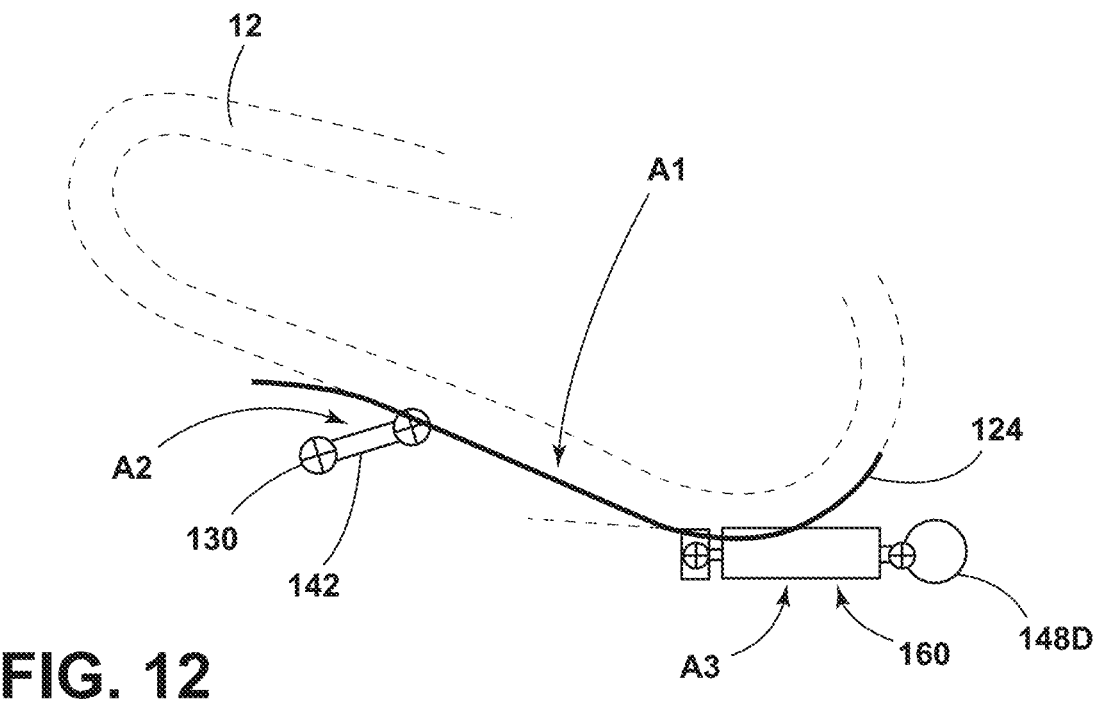
FIG. 12 is a side schematic view of the displaceable platform in a design position.
Figure 13:
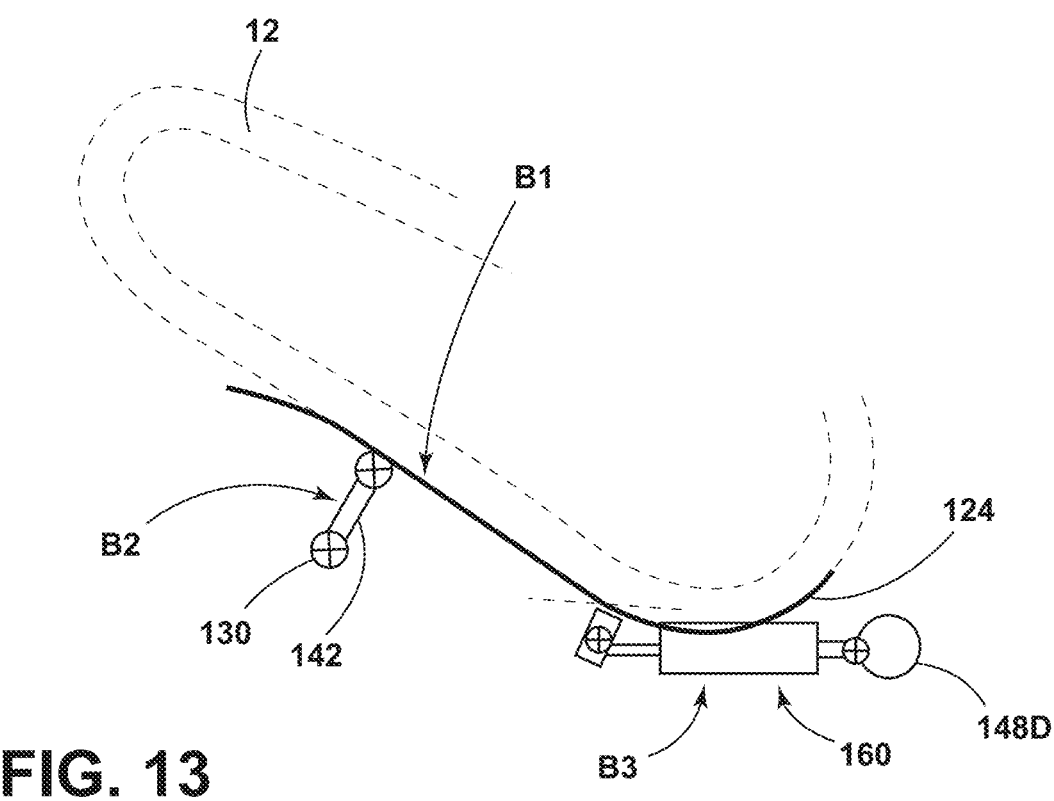
FIG. 13 is a side schematic view of the displaceable platform in a fully deployed position.
Figure 14:
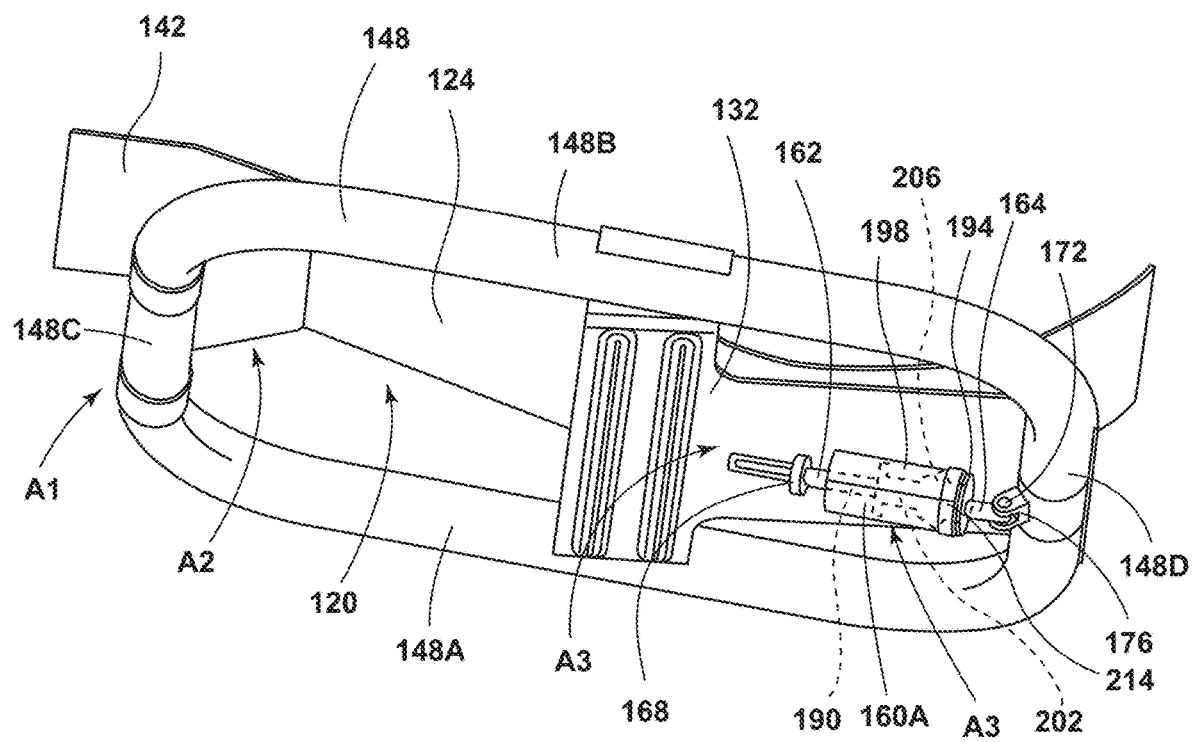
FIG. 14 is a bottom perspective view of a suspension system with the displaceable platform in the fully deployed position, according to an embodiment.
Figure 15:
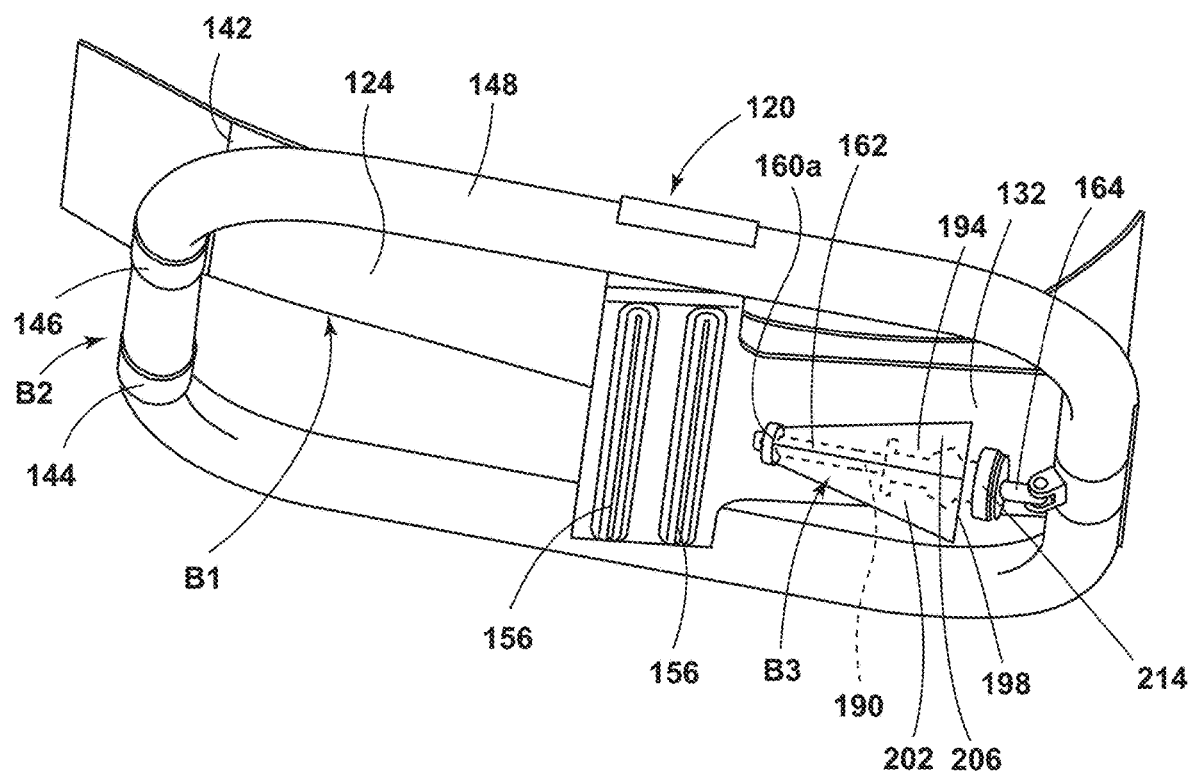
FIG. 15 is a bottom perspective view of a suspension system of FIG. 14 with the displaceable platform in a fully deployed position.

With reference to FIGS. 12 and 13, schematic views of the displaceable platform 124 are shown in the design position A1 (FIG. 12) and the fully deployed position B1 (FIG. 13). With reference to FIG. 12, a passenger 12 is shown on the displaceable platform 124. The displaceable platform 124 is shown in the design position A1. The pitch plate 142 is shown in a lowered position A2. The attachment member 160 is shown in a rest position A3.

With reference to FIG. 13, a passenger 12 is shown on the displaceable platform 124. The displaceable platform 124 is shown in the fully deployed position B1. The pitch plate 142 is shown in an extended position B2. The attachment member 160 is shown in an extended position B3.

Referring now to FIGS. 14-18, another embodiment of the attachment member 160 is shown. The attachment member 160A may include a retraction mechanism 190. As previously explained with reference to at least FIG. 4, during a sudden vehicle 18 deceleration represented by force F1 in FIGS. 3 and 4, the displaceable platform 124 may move from the design position A1 to the fully deployed position B1. After the sudden deceleration, the attachment member 160A may include a retraction mechanism 190 that retracts the displaceable platform 124 from the fully deployed position B1 to the design position A1.

Figure 16:
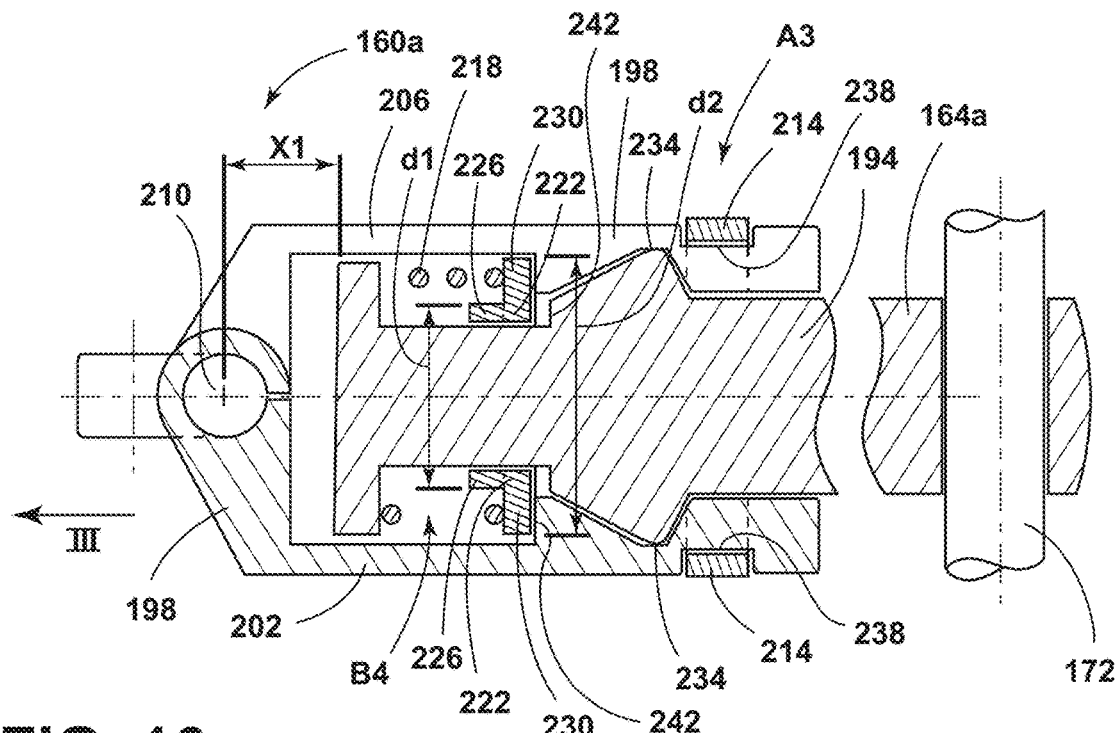
FIG. 16 is a cross-sectional view of an attachment member in a rest position.
Figure 17:
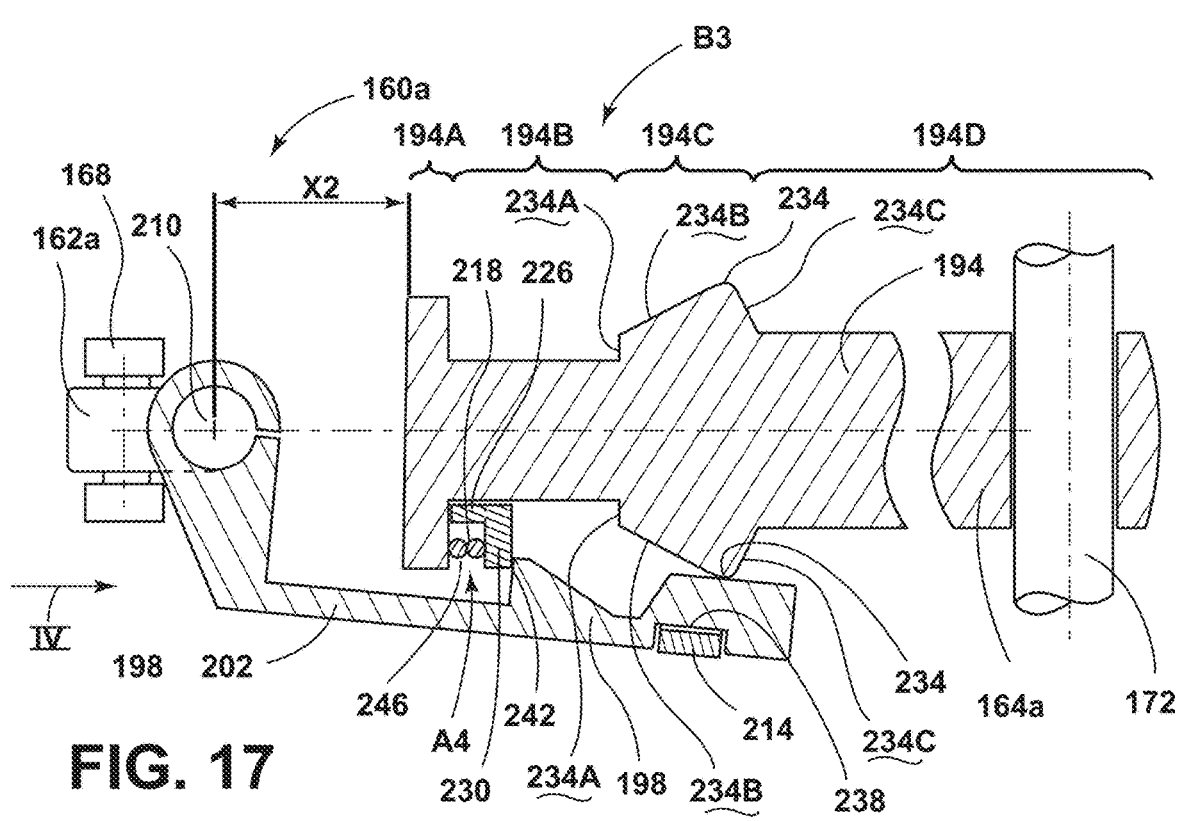
FIG. 17 is a cross-sectional view of a portion of an attachment member in an extended position.

Referring to FIGS. 16-17, the retraction mechanism 190 in the attachment member 160A may include a core member 194 and a housing 198. The core member 194 may be resiliently biased with respect to the housing 198. The housing 198 may surround the core member 194. The housing 198 may be fixedly attached to the first end 162 of the attachment member 160A. The housing 198 may be laterally movable along core member 194 in the direction shown by arrow III. Movement of the housing 198 toward and away from the core member 194 may shorten and lengthen the attachment member 160A between a rest position A3 and an extended position B3. The core member 194 may have various diameters along the length of the core member 194. The housing 198 may have interior diameters that may correspond to the diameters of the core member 194 along the length of the core member 194. That is, the outer contour of the core member 194 may generally match the inner contour of the housing 198.

Referring to FIGS. 14-18, the housing 198 may include a first housing part 202 and a second housing part 206. The first housing part 202 and the second housing part 206 may be designed to allow movement of the housing 198 along the core member 194. The housing 198 may be divided into first and second housing parts 202, 206 so that the first and second housing parts 202, 206 may pivot about the axis 130 extending through the first and second housing parts 202, 206. As the first and second housing parts 202, 206 pivot outward, an elastic member (band 214) may maintain the first and second housing parts 202, 206 in contact with at least the third portion of the core member 194. The elastic member may be designed with a predetermined elasticity.

Referring to FIGS. 16-17, the core member 194 may include a first portion 194A, a second portion 194B, a third portion 194C, and a fourth portion 194D. The first portion 194A may include a cylindrical end portion having a first diameter. A second portion 194B of the core member 194 may be next to first portion 194A of the core member 194. The second portion 194B may include a second diameter. The second diameter may be selected to allow an elastic member to be disposed between the housing 198 and the core member 194 at the second portion 194B of the core member 194. The elastic member may include a coil spring 218. A slidable ring 222 may be disposed around the second portion 194B of the core member 194. The slidable ring 222 may include a first ring portion 226 and a second ring portion 230. The first ring portion 226 of the slidable ring 222 may include a first diameter d1. The second portion 194B of the slidable ring 222 may include a second diameter d2. The slidable ring 222 may function as a spacer when the coil spring 218 is in the compressed position A4 (FIG. 17). The slidable ring 222 may function as a stopper when the coil spring 218 is in an expanded position B4 (FIG. 16). The outer diameter d2 of the second ring portion 230 may be greater than the outer diameter d1 of the first ring portion 226.

With continuing reference to FIGS. 16-17, the core member 194 may include a third portion 194C defined by an outward extending rib 234. The outward extending rib 234 may include a contour defined by a surface 234A transverse to the core member 194, a first sloped surface 234B, and a second sloped surface 234C. The first sloped surface 234B and the second sloped surface may intersect to define the greatest diameter of the third portion 194C. A fourth portion 194D of the core member 194 may have a fourth diameter.

Figure 18:
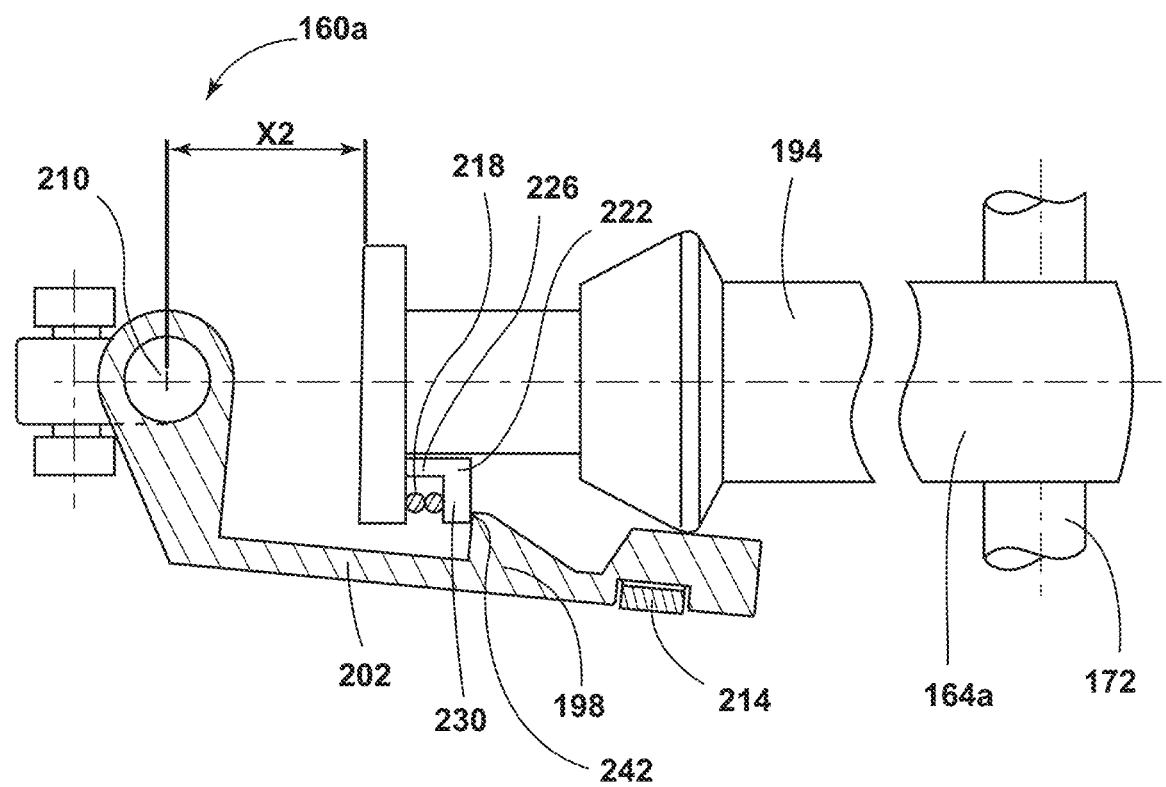
FIG. 18 is a partial cross-sectional view of portions of an attachment member.

With continued reference to FIGS. 16-18, the band 214 may be disposed around the housing 198. The housing 198 may include a groove 238 for receiving the band 214.

With reference to FIGS. 16-17, the attachment member 160A may move between a rest position A3 (FIG. 16) and an extended position B3 (FIG. 17). In the rest position A3, a distance X1 may exist between the axis 210 and the core member 194. In the extended position B3, a distance X2 may exist between the axis 210 and the core member 194. As the housing 198 moves away from the core member 194 in the direction shown by arrow III, the housing 198 moves over the third portion 194C of the core member 194 and an abutment 242 of the housing 198 pushes the second ring portion 230 of the slidable ring 222 to compress the spring 218. Thus, the cavity 246 that the spring 218 is in may have various sizes in response to movement of the housing 198 in the direction III away from the core member 194 or movement of the housing 198 in the direction IV toward the core member 194.

With continued reference to FIGS. 16-17, after the displaceable platform 124 has moved from the design position A1 to the fully deployed position B1 in response to a force F1 shown in FIGS. 3 and 4 and indicative of a sudden vehicle deceleration and due to a force F2 show in FIG. 4, the coil spring 218 may expand to move the housing 198 in the direction shown by arrow IV and to move the displaceable platform 124 from the fully deployed position B1 to the design position A1.

Referring now to FIG. 18, the retraction mechanism 190 is shown with the core member 194 shown in a side elevational view and the first housing part 202 in a cross-sectional view. As such, FIG. 18 shows the contours of core member 194.

A variety of advantages may be derived from the present disclosure. The suspension system 128 may be a passive system. The suspension system 128 may be lightweight. The suspension system 128 may be integrated into a seat 60 that may include a seat cushion 112. The suspension system 128 may be used with variety of vehicle restraints to limit movement of a passenger 12 along a seat surface 61 during a sudden deceleration of the vehicle 18 (shown by arrow F1 in FIGS. 3 and 4). The suspension system 128 may act as a support for the seat cushion 112. The suspension system 128 may provide comfort support to a passenger 12 seated on the seat cushion 112. The suspension system 128 may also act as a hip and leg deceleration device as the displaceable platform 124 moves from the design position A1 to the fully deployed position B1.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seating assembly comprising:
 a seat cushion;
 a suspension system disposed proximate an underside of the seat cushion and including:
  a carrier assembly; and
  a displaceable platform positionable between a design position and a fully deployed position and pivotably coupled to a front portion of the carrier assembly; and
 an attachment member extending between the displaceable platform and a rear portion of the carrier assembly and including:
  a link; and
  a retraction mechanism comprising a core member and a housing, wherein the retraction mechanism is positionable between a rest position if the displaceable platform is in the design position and an extended position if the displaceable platform is in the fully deployed position, wherein the housing is fixedly coupled to the link and wherein the link is fixedly coupled to the displaceable platform, wherein the core member is fixedly coupled to the rear portion of the carrier assembly, wherein the housing is laterally movable along the core member as the retraction mechanism moves from the rest position to the extended position, wherein the housing surrounds the core member, wherein the housing includes a first housing part and a second housing part, wherein each of the first and second housing parts are pivotable about an axis that extends through the first and second housing parts, and wherein the first housing part and the second housing part pivot outward from the core member as the retraction mechanism moves from the rest position to the extended position.

2. The vehicle seating assembly of claim 1, wherein the retraction mechanism includes an elastic band disposed around the first and second housing parts.

3. The vehicle seating assembly of claim 2, wherein the core member includes a biasing mechanism configured to move the retraction mechanism from the extended position to the rest position after a sudden vehicle deceleration.

4. The vehicle seating assembly of claim 3, wherein the biasing mechanism includes a coil spring disposed around the core member and configured to exert a force on a slidable ring disposed around the core member.

5. The vehicle seating assembly of claim 3, wherein the link includes a T-shaped link.

* * * * *